US010511510B2

(12) United States Patent
Ricci

(10) Patent No.: US 10,511,510 B2
(45) Date of Patent: Dec. 17, 2019

(54) PERFORMANCE OF COMMUNICATION NETWORK BASED ON END TO END PERFORMANCE OBSERVATION AND EVALUATION

(71) Applicant: Accenture Global Solutions Limited, Dublin (IE)

(72) Inventor: Alessio Ricci, Rome (IT)

(73) Assignee: Accenture Global Solutions Limited, Dublin (IE)

( * ) Notice: Subject to any disclaimer, the term of this patent is extended or adjusted under 35 U.S.C. 154(b) by 273 days.

(21) Appl. No.: 15/350,635

(22) Filed: Nov. 14, 2016

(65) Prior Publication Data

US 2018/0139116 A1    May 17, 2018

(51) Int. Cl.
   H04L 12/26    (2006.01)

(52) U.S. Cl.
   CPC .......... H04L 43/0876 (2013.01); H04L 43/16 (2013.01)

(58) Field of Classification Search
   None
   See application file for complete search history.

(56) References Cited

U.S. PATENT DOCUMENTS

| 8,719,398 | B2 | 5/2014 | Qian | |
|---|---|---|---|---|
| 9,432,865 | B1 * | 8/2016 | Jadunandan | .......... H04W 24/08 |
| 10,225,365 | B1 * | 3/2019 | Hotchkies | ............ H04L 67/327 |
| 2003/0126255 | A1 | 7/2003 | Rice et al. | |

(Continued)

FOREIGN PATENT DOCUMENTS

| AU | 2017235914 | 4/2019 |
|---|---|---|
| CN | 108075925 | 5/2018 |

(Continued)

OTHER PUBLICATIONS

Australian search report for Appln. No. 2017235914, dated Sep. 11, 2018, 11 pages.

(Continued)

Primary Examiner — Kevin T Bates
Assistant Examiner — Ronak Patel
(74) Attorney, Agent, or Firm — Fish & Richardson P.C.

(57) ABSTRACT

Methods, systems, and apparatus, including computer programs encoded on a computer storage medium, for observing, evaluating, and improving performance of one or more communication networks. A generated performance index for a communication network is received, an external performance index for the communication network is received, and in response to determining a discrepancy between the generated performance index and the external performance index, key performance indicators associated with the communication network are evaluated. The performance index is generated based at least in part on a set of key performance indicators and corresponding thresholds values. The external performance index represents user experience with the communication network. In response to determining that a value of a given key performance indicator fails a threshold comparison against its one or more corresponding threshold values, one or more settings for the communication network are automatically modified.

18 Claims, 6 Drawing Sheets

(56) References Cited

U.S. PATENT DOCUMENTS

| | | | |
|---|---|---|---|
| 2006/0023642 A1* | 2/2006 | Roskowski | H04W 24/00 |
| | | | 370/254 |
| 2010/0003923 A1* | 1/2010 | McKerlich | H04L 12/14 |
| | | | 455/67.11 |
| 2011/0176598 A1* | 7/2011 | Kohout | G01R 31/02 |
| | | | 375/227 |
| 2012/0282968 A1 | 11/2012 | Toskala et al. | |
| 2013/0122854 A1* | 5/2013 | Agarwal | H04L 12/141 |
| | | | 455/405 |
| 2013/0272150 A1 | 10/2013 | Wan et al. | |
| 2013/0304905 A1 | 11/2013 | Appachiappan et al. | |
| 2014/0160941 A1 | 6/2014 | Hui et al. | |
| 2016/0112894 A1 | 4/2016 | Lau et al. | |
| 2018/0139116 A1 | 5/2018 | Ricci | |

FOREIGN PATENT DOCUMENTS

| | | |
|---|---|---|
| EP | 2611074 | 7/2013 |
| EP | 3322126 | 5/2018 |

OTHER PUBLICATIONS

Australian Office Action for Application No. 2017235914, dated Mar. 28, 2018, 8 pages.
European Search Report for Application No. 17194773, dated Feb. 22, 2018, 8 pages.
NetScan, Network Monitoring System, "Deployment Roadmap over EPC/LTE Network Monitoring," Retrieved from <<https://gs-systems.ru/images/scan/NetScan.pdf>> on Apr. 27, 2016, 30 pages.
CA Office Action in Canadian application No. 2,983,495, dated Aug. 14, 2018, 4 pages.
Canadian Office Action for Application No. 2,983,495, dated Jul. 15, 2019. 3 pages.

* cited by examiner

PERFORMANCE OF COMMUNICATION NETWORK BASED ON END TO END PERFORMANCE OBSERVATION AND EVALUATION

BACKGROUND

Communication networks (e.g., cellular networks) are networks that provide wired and wireless links for communication devices (e.g., phones, mobile phones, smartphones, tablet computers, laptop computers, personal digital assistants, vehicle computer devices, game devices, etc.). The networks can be distributed over wide geographic areas, served by multiple nodes (e.g., base stations for wireless networks) that provide coverage used to transmit voice and data. The nodes can be connected, enabling the communication devices to communicate with the nodes and with each other anywhere in the network. Communication networks can maintain data (e.g., log data, indicators, alarms, etc.) associated with communications handled by the network.

SUMMARY

Implementations of the present disclosure include computer-implemented methods for evaluating and improving performance of one or more communication networks. In some implementations, actions include receiving a generated performance index for a communication network, receiving an external performance index for the communication network, and in response to determining a discrepancy between the generated performance index and the external performance index, evaluating one or more key performance indicators associated with the communication network. The performance index is generated based at least in part on a set of key performance indicators and corresponding thresholds values. The external performance index represents user experience with the communication network. Evaluating one or more key performance indicators includes, for each key performance indicator, receiving data associated with the key performance indicator, based at least in part on the received data, determining a key performance indicator value and one or more corresponding threshold values for the key performance indicator, and comparing the key performance indicator value to the corresponding one or more threshold values. In response to determining that a value of a given key performance indicator fails a threshold comparison against its one or more corresponding threshold values, one or more settings for the communication network are automatically modified. Other implementations of these aspects include corresponding systems, apparatus, and computer programs, configured to perform the actions of the methods, encoded on computer storage devices.

These and other implementations can each optionally include one or more of the following features. The communication network can be a mobile and/or fixed communication network. In response to determining that the value of the given key performance indicator fails a threshold comparison against its one or more corresponding threshold values, the set of key performance indicators can be updated to include the given key performance indicator and its one or more corresponding threshold values. The data associated with the key performance indicator can be communication event data received from the communication network. The data associated with the key performance indicator can include data received from one or more business support systems of the communication network. The one or more key performance indicators under evaluation can include at least one key performance indicator included in the set of key performance indicators on which the generated performance index for the communication network is based. The one or more key performance indicators under evaluation can include at least one key performance indicator not included in the set of key performance indicators on which the generated performance index for the communication network is based. Determining the key performance indicator value can include identifying a plurality of components of the key performance indicator, identifying a component value for each of the plurality of components, and performing a calculation using the respective component values. Evaluating one or more key performance indicators associated with the communication network can include filtering the received data for each of two or more different dimensions, and for each given dimension of the two or more different dimensions, determining a key performance indicator value and one or more corresponding threshold values for the key performance indicator in the given dimension, and comparing the key performance indicator value to the corresponding one or more threshold values in the given dimension. The two or more different dimensions can include two or more of a service dimension that indicates a type of service provided by the communication network, a location dimension that indicates a location serviced by the communication network, a device dimension that indicates a type of device serviced by the communication network, and a network dimension that indicates a type of network offered by the communication network. A series of comparison results can be stored associated with comparing each key performance indicator value to its one or more corresponding thresholds. The set of key performance indicators can be updated to include the given key performance indicator and its one or more corresponding threshold values in response to two or more consecutive occurrences of the given key performance indicator failing the threshold comparison against its one or more corresponding threshold values, based on the stored series of comparison results. The set of key performance indicators can be updated to include the given key performance indicator and its one or more corresponding threshold values in response to a predetermined percentage of occurrences of the given key performance indicator failing the threshold comparison against its one or more corresponding threshold values in a predetermined observation window, based on the stored series of comparison results.

Implementations of the present disclosure provide one or more of the following advantages. Lists of key performance indicators, associated thresholds, and associated weights can be maintained for multiple different communication networks, facilitating the evaluation of different networks using different criteria. The performance (i.e., health) of a communication network can be evaluated, as the performance and capabilities of the network changes over time, and as the standards for assessing the network changes over time. A subset of possible key performance indicators may be used for generating a performance index, conserving processing resources, and improving processing times. Polarization in one or more dimensions can be determined, which may be useful for identifying and troubleshooting particular types of problems which may occur in communication networks. Communication networks can be manually or automatically reconfigured and performance may be improved. Network performance factors that may not be typically associated with poor network performance may be discovered and may be considered when evaluating performance of the communication network.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to observing, evaluating, and improving performance of one or more communication networks. In general, end to end performance of a communication network can be observed and evaluated, and a generated performance index for the communication network can be compared to an external performance index that represents user experience with the communication network. In response to determining a discrepancy between the generated performance index and the external performance index, one or more key performance indicators associated with the communication network can be evaluated. To evaluate each key performance indicator, for example, data associated with the key performance indicator is received, a key performance indicator value and one or more corresponding threshold values for the key performance indicator are determined, and the key performance indicator value is compared to the corresponding one or more threshold values. In response to determining that a value of a given key performance indicator fails a threshold comparison against its one or more corresponding threshold values, a set of key performance indicators used to generate the performance index can be dynamically updated to include the given key performance indicator and its one or more corresponding threshold values. In some implementations, settings for the communication network settings may be automatically modified to resolve an identified network problem.

Figure 1:
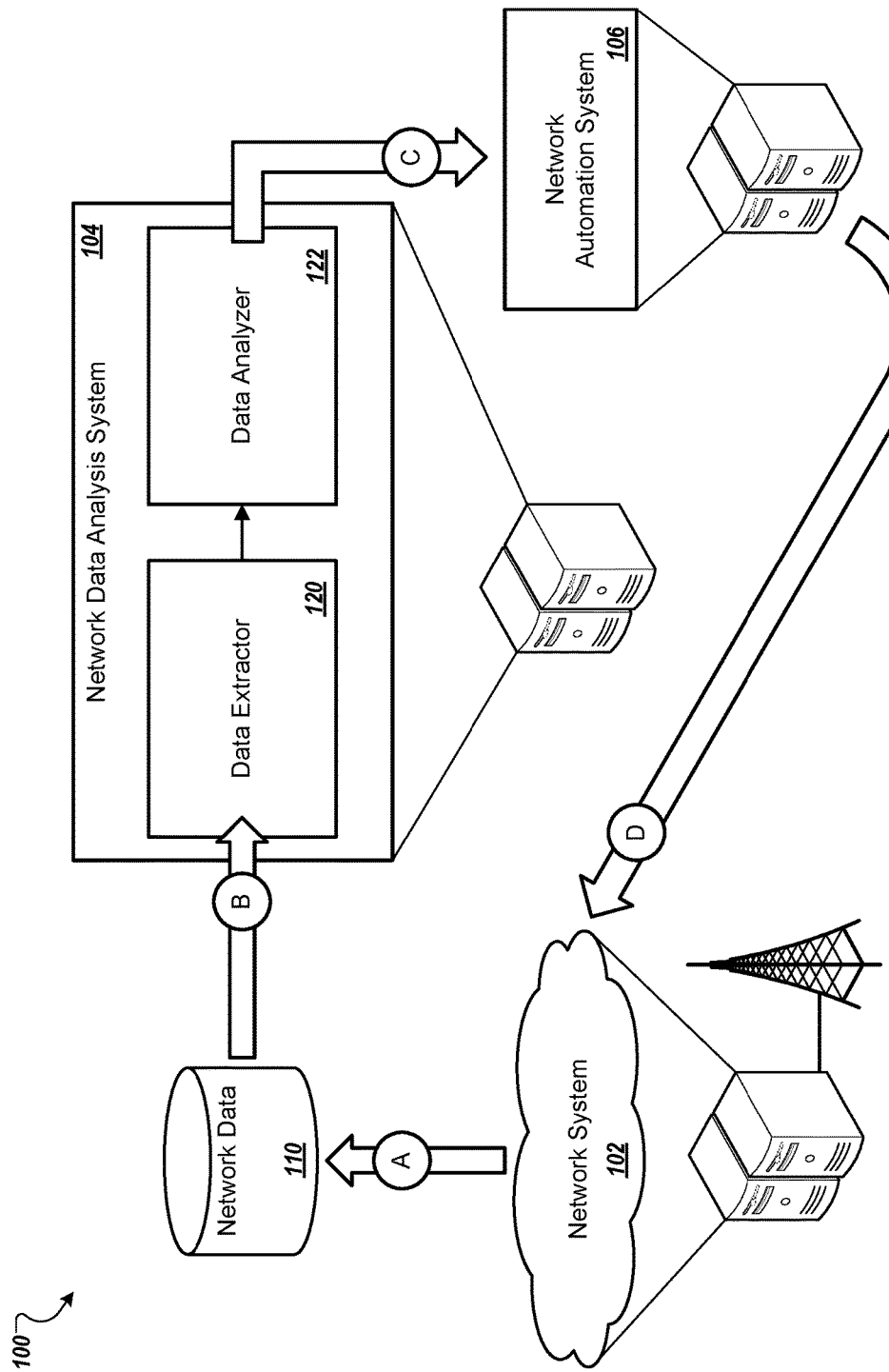
FIGS. 1-5 depict example systems that can execute implementations of the present disclosure.

FIG. 1 depicts an example system 100 that can execute implementations of the present disclosure. In the depicted example, the system 100 includes a network system 102 (e.g., a mobile and/or fixed communication network), a network data analysis system 104, and a network automation system 106. Each of the systems 102, 104, and 106, for example, can include one or more servers, including, but not limited to web servers, application servers, network servers, and/or server farms. In some examples, two or more of the systems 102, 104, and 106 can be combined into a single system. In some implementations, the following example stages can be used for analyzing data associated with a communication network, evaluating a performance of the communication network, and automatically reconfiguring the communication network to improve network performance.

At stage "A," network data 110 related to the network system 102 can be collected and stored (e.g., by a big data system, or another suitable system for collecting, maintaining, and providing access to large data sets). For example, as the network system 102 provides service to user devices (e.g., phones, mobile phones, smartphones, tablet computers, laptop computers, personal digital assistants, vehicle computer devices, game devices, or other suitable devices), communication event data related to use and performance of the network can be collected and stored, such as data related to incidents of connections being dropped by the network, incidents of connections being terminated by users, incidents of redials, call duration, data throughput, user latency, and other suitable data. In some implementations, the communication event data related to use and performance of the network may be correlated with device data, such as a type of device (e.g., model of smartphone), a location of the device (e.g., geographical coordinates), a type of service being used (e.g., voice, data, multimedia messaging service (MMS), short messaging service (SMS)), a type of network being used (e.g., 2G, 3G, 4G, 5G, WiFi, etc.), and other appropriate anonymized data. In some implementations, the communication event data may include log data and counters from a radio network controller (RNC), a base transceiver station (BTS), a mobile management entity (MME), or another component of the network system 102. In some implementations, the network data 110 may include survey data related to user experience with the network system 102 (e.g., marketing information, user behavior information, demographic information, billing information, etc.). In some implementations, the network data 110 may include business support system data (e.g., churn risk indicators, revenue variation indicators, new offer indicators, repeated action indicators) provided by one or more business systems of the network system 102. In some implementations, the network data 110 may include customer support data (e.g., incident reports, trouble tickets) related to user experience with the network system 102.

At stage "B," the network data analysis system 104 receives at least a portion of the network data 110. For example, the network data analysis system 104 can use a data extractor 120 (e.g., a hardware and/or software-based component) to communicate with a source of the network data 110 (e.g., using a network communication protocol, an application programming interface, and/or another suitable technique), and can provide data received from a source of the network data 110 to a data analyzer 122 (e.g., a hardware and/or software-based component) for analysis. Analysis performed by the data analyzer 122 can include comparing various network performance factors (e.g., dropped connections by the network, terminated connections by users, redials, call duration, data throughput, user latency, and other suitable factors) against corresponding thresholds to identify one or more network performance factors that are out of an expected range. As described in further detail with reference to FIG. 2, analysis of the various network performance factors may occur when an external performance index score (e.g., based on survey data and/or other user experience data) is poor and/or does not reflect an expected score. Thus, network performance factors that may not be typically associated with poor network performance may be discovered (e.g., terminated connections by users) and may be considered during further performance evaluation of a mobile and/or fixed communication network.

At stage "C," the network data analysis system 104 can provide a notification to the network automation system 106 that one or more network performance factors are associated with values that are out of an expected range. At stage "D," upon receiving the notification, for example, the network automation system 106 can perform one or more actions for modifying the network system 102. For example, the network automation system 106 can modify one or more configuration and/or communications settings of the network system 102, can deploy one or more software updates to the network system 102 and/or to devices (e.g., mobile devices) that communicate over the network, can increase and/or decrease transmission power of base transceiver stations of the network system 102, or perform other appropriate actions.

Figure 2:
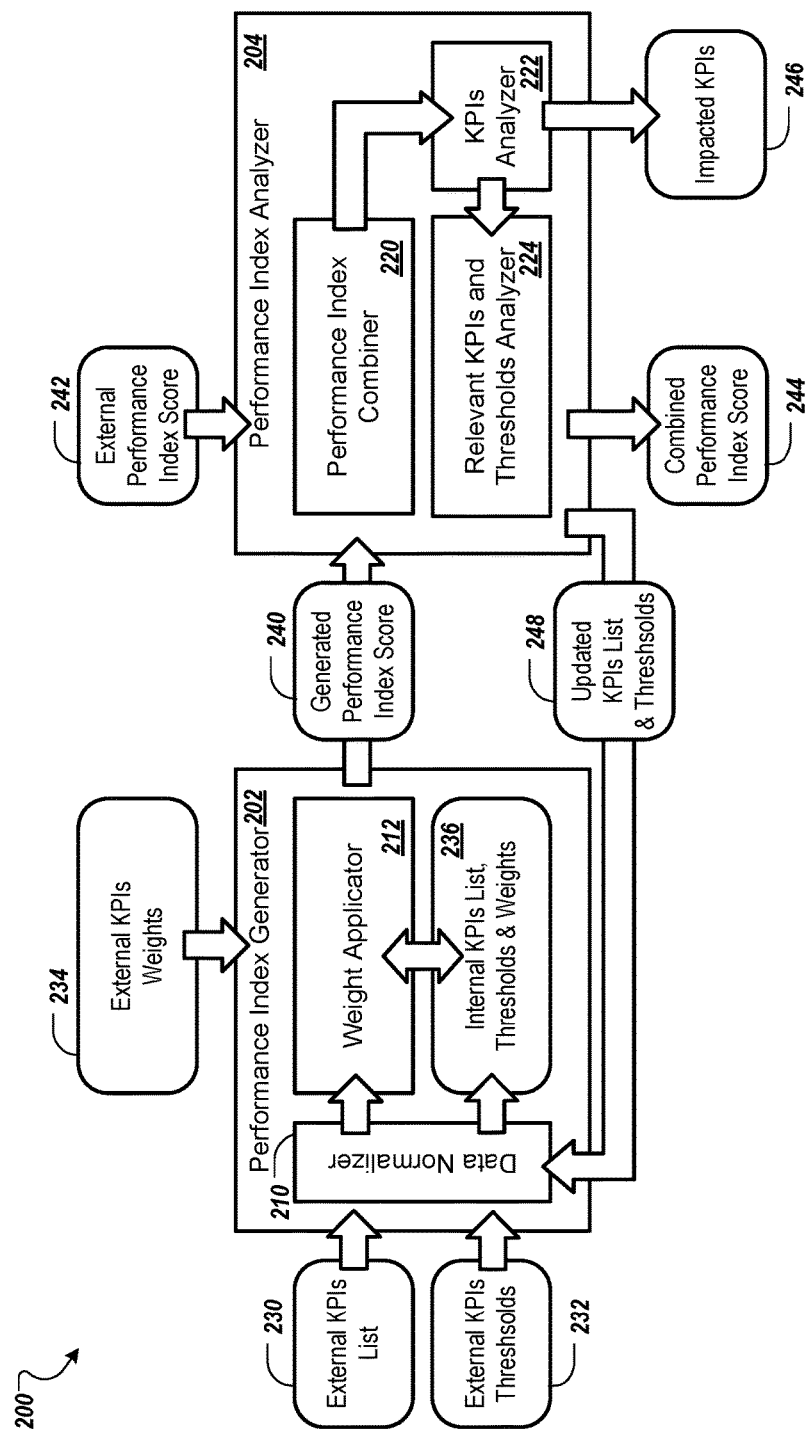

FIG. 2 depicts an example system 200 that can execute implementations of the present disclosure. In the present example, the system 200 includes multiple hardware and/or software components (e.g., modules, objects, services) including a performance index generator 202 and a performance index analyzer 204. Two or more of the components 202 and 204 may be implemented on the same device (e.g., same computing device), or on different devices, such as devices included in a computer network, or peer-to-peer network. For example, the components 202 and 204 may be implemented by the network data analysis system 104 (shown in FIG. 1). In the present example, each of the components 202 and 204 includes various subcomponents. The performance index generator 202, for example, includes a data normalizer 210 and a weight applicator 212. The performance index analyzer 204, for example, includes a performance index combiner 220, a key performance indicator (KPI) analyzer 222, and a relevant KPI and thresholds analyzer 224.

As shown in FIG. 2, for example, the performance index generator 202 can optionally receive an external list of key performance indicators (KPIs) 230, associated external key performance index thresholds 232, and associated external key performance index weights 234, which can be used to supplement an internal list of key performance indicators, thresholds, and weights 236 that are used to evaluate the performance of a communication network. Key performance indicators, for example, may include various measurable aspects of the communication network's performance, and may include various measurable aspects of user activity on the communication network. For example, an external key performance indicator may include a voice quality perception indicator which may be measured and provided by a particular communication network, but which may or may not be provided by all communication networks. Key performance indicators generally provided by communication networks and included in the internal list 236, for example, may include one or more drop rate indicators, one or more access rate indicators, one or more connection time indicators, one or more call duration indicators, one or more user data throughput indicators (e.g., heavy and normal), one or more user latency indicators (e.g., heavy and normal), and other suitable indicators. Key performance indicators generally provided by business support systems of communication networks and included in the internal list 236, for example, may include a churn risk indicator (e.g., an indication of a risk of unsubscribing by a communication network user), an average revenue per user variation indicator (e.g., an indication of whether average revenue per user for a communication network increases, decreases, or remains constant), a new offer indicator (e.g., an indication of whether new offers were accepted within a predetermined period of time, such as a month), a same action repeated indicator (e.g., an indication of whether voice calls with a same destination and/or origination number (or data calls with a same URL request) were performed within a predetermined period of time (e.g., two minutes) and other suitable indicators.

Each key performance indicator may be associated with one or more threshold values, which may be used to assign a rating to the key performance indicator, based on performing a threshold check on a measured value for the key performance indicator. If a measured value for a particular key performance indicator fails to meet a threshold value for the key performance indicator, for example, the key performance indicator may be associated with a failed threshold comparison (e.g., a poor rating). As another example, if the measured value for the particular key performance indicator meets or exceeds the threshold value for the key performance indicator, the key performance indicator may be associated with a passed threshold comparison (e.g., a good rating). Alternately, a measured value for a key performance indicator that is less than or meets the threshold value may be associated with a passed threshold comparison (e.g., a good rating) and a measured value for a key performance indicator that exceeds the threshold value may be associated with a failed threshold comparison (e.g., a poor rating). As an example, a threshold value for a drop rate indicator may be associated with a value of one percent. If a drop rate for a particular communication network is determined to be less than or equal to one percent, for example, the drop rate indicator may be associated with a good rating, whereas if the drop rate is determined to exceed one percent, the drop rate indicator may be associated with a poor rating.

In some implementations, a key performance indicator may be associated with a minimum threshold value and a maximum threshold value. If a measured value for a particular key performance indicator fails to meet the minimum threshold value for the key performance indicator, for example, the key performance indicator may be associated with a failed threshold comparison (e.g., a poor rating). As another example, if the measured value for the particular key performance indicator meets or exceeds the maximum threshold value for the key performance indicator, the indicator may be associated with a passed threshold comparison (e.g., a good rating). Alternately, a measured value for a key performance indicator that is less than or meets the minimum threshold value may be associated with a passed threshold comparison (e.g., a good rating) and a measured value for a key performance indicator that exceeds the maximum threshold value may be associated with a failed threshold comparison (e.g., a poor rating). A measured value for a key performance indicator that is between the minimum and maximum threshold values may be associated with an intermediate rating, for example. As an example, a minimum threshold value for a user latency indicator may be associated with a value of fifty milliseconds, and a maximum threshold value for the user latency indicator may be associated with a value of eight hundred and fifty milliseconds. If a user latency for a particular communication network is less than or equal to fifty milliseconds, for example, the user latency indicator may be associated with a good rating, whereas if the user latency is determined to exceed eight hundred and fifty milliseconds, the user latency indicator may be associated with a poor rating. If the user latency is determined to be between fifty milliseconds and eight hundred and fifty milliseconds, for example, the user latency indicator may be associated with an intermediate (e.g., fair) rating.

Each key performance indicator may be associated with a corresponding weight value, which may be used to determine a contribution of the key performance indicator to an overall performance index score (i.e., an score that indicates an overall system health) for a particular communication network, as described in further detail below. For example, a drop rate indicator may be associated with a corresponding weight value that is different from (e.g., higher or lower than) a weight value associated with a user latency indicator.

In general, the key performance indicators maintained in the internal list 236 and that are used to evaluate the performance of a communication network, may represent a subset of all possible key performance indicators that could be used to evaluate network performance. Additional key performance for evaluating the communication network may be provided by one or more external sources, and/or may be discovered through analysis and added to the internal list 236. The external list of key performance indicators (KPIs) 230, associated external KPI thresholds 232, and associated external KPI weights 234, for example, may vary between different communication networks, and may be provided by a communication network. For example, a particular communication network may measure values for certain performance indicators (e.g., a voice quality perception indicator) that may or may not be measured by other communication networks. In regard to the thresholds 232, for example, a threshold value that indicates a certain level of performance (e.g., good, fair, poor) by a particular communication network may indicate a different level of performance by a different communication network. In regard to the weights 234, for example, a key performance indicator that is of importance to a particular communication network may be of greater or lesser importance, and may be associated with a different weight, by a different communication network. As the performance index generator 202 is configured to receive and process external lists of key performance indicators, associated external thresholds and associated external weights, and to receive and process lists of key performance indicators and associated thresholds discovered through further analysis, for example, the performance index generator 202 has the flexibility to continue to assess the performance (i.e., system health) of multiple different communication networks, as the capabilities of the networks change over time, and as the standards for assessing the networks change over time.

The performance index generator 202 can generate an overall performance index score 240 (i.e., an overall system health score) for a communication network under evaluation, based on key performance indicators, associated key performance index thresholds, and associated key performance index weights. Key performance indicators, thresholds, and/or weights can include external, dynamic, and/or static (e.g., hard coded) values, for example. To generate the overall performance index score 240, for example, data that pertains to each of the key performance indicators (e.g., the network data 110, shown in FIG. 1) can be accessed and can be compared to the corresponding thresholds. For example, the performance index generator 202 can parse one or more lists of key performance indicators (e.g., the external list of key performance indicators 230 and the internal list of key performance indicators 236). For each of the key performance indicators, for example, the performance index generator 202 can access communication network data that pertains to the key performance indicator (e.g., relevant communication event data), and can determine a corresponding value for the key performance indicator (e.g., by aggregating the relevant event data over a predetermined amount of time). The performance index generator 202, for example, can then compare the value for the key performance indicator to one or more corresponding threshold values (e.g., the external KPI thresholds 232 and internal KPI thresholds 236).

In some implementations, comparing a value for a key performance indicator to one or more corresponding threshold values may include applying a normalization function. For example, the performance index generator 202 can use the data normalizer 210 to apply a step function, in which a key performance indicator is associated with either a first constant value (e.g., one or zero) that indicates a poor rating, a second constant value (e.g., zero or one) that indicates a good rating, or a third variable value that is between the first constant value and the second constant value, based on the value for the key performance indicator relative to the one or more corresponding threshold values. Key performance indicator values that are less than a minimum threshold value, for example, can be associated with the first constant value, whereas key performance indicator values that are greater than a maximum threshold value can be associated with the second constant value. A key performance indicator value that falls between the minimum and maximum threshold values can be associated with a value that is between the first and second constant values, for example, by dividing a difference between the key performance indicator value and the minimum threshold value, by a difference between the maximum and minimum threshold values. By applying the normalization function, for example, key performance indicators that are measured using different scales and/or units of measurement (e.g., Likert scale, percentage, duration, data rate, or another scale and/or unit of measurement) can be directly compared and can be aggregated to generate an overall performance index score (i.e., an overall system health score) for a communication network.

In some implementations, generating an overall performance index score may include applying a weight function to each of the normalized key performance indicator values. For example, the performance index generator 202 can use the weight applicator 212 to apply an appropriate weight value (e.g., from the external KPI weights 234 and internal KPI weights 236) to each of the normalized values for the corresponding key performance indicators, and can calculate a weighted average of the normalized values, which can be provided to the performance index analyzer 204 as the overall performance index score 240. In some implementations, generating the overall performance index score may include a rescaling of the weighted average of the normalized values. For example, after calculating the weighted average of the normalized values, the overall performance index score may be associated with a first constant value (e.g., one) if the weighted average falls within a first range of values (e.g., $0.8 < X <= 1.0$), a second value (e.g., two) if the weighted average falls within a second range of values (e.g., $0.6 <= X < 0.8$), a third value (e.g., three) if the weighted average falls within a third range of values (e.g., $0.4 <= X < 0.6$), a fourth value (e.g., four) if the weighted average falls within a fourth range of values (e.g., 0.2<=X<0.4), or a fifth value (e.g., five) if the weighted average falls within a fifth range of values (e.g., 0.0<=X<0.2). As the overall performance index score 240 can be based on a subset of possible key performance indicators and not all key performance indicators, for example, processing resources may be conserved, and processing times improved.

The performance index analyzer 204 can receive the generated performance index score 240, can combine the score 240 with an external performance index score 242, and can provide a combined performance index score 244. The external performance index score 242, for example, can be based on survey data collected from users of a communication network or from another automatic system. For example, users of the network system 102 (shown in FIG. 1) can be polled in regard to various aspects of user experience related to use of the network system, or the users may provide other feedback. The performance index combiner 220 can combine the generated performance index score 240 and the external performance index score 242, for example, by aggregating the scores, averaging the scores, performing a weighted average of the scores, or using another suitable combination technique.

In some implementations, component analysis of a generated performance index score may be performed. For example, the key performance indicator analyzer 222 can periodically or continually analyze components of the generated performance index score 240, and/or additional key performance indicators which had not been used to generate the score 240 (e.g., one or more key performance indicators selected from a superset of all possible key performance indicators). As another example, the performance index combiner 220 can compare the generated performance index score 240 with the external performance index score 242, and analysis of components of the generated performance index score 240 and/or additional key performance indicators may be performed by the key performance indicator analyzer 222 in response to a discrepancy between the scores (e.g., an absolute or relative difference between the scores, such as a 10% difference, a 20% difference, or another appropriate difference). For example, if the external performance index score 242 is identified as being lower than the generated performance index score 240, performance of a communication network (e.g., the network system 102, shown in FIG. 1) may not be accurately reflected by its corresponding generated performance index score 240. Components (e.g., individual key performance indicators) of the generated performance index score 240 and/or additional key performance indicators can be analyzed to identify a source of the discrepancy, which may subsequently be used (e.g., by the network automation system, shown in FIG. 1) to troubleshoot and/or modify the network system 102. Through an analysis of components of the generated performance index score 240 and/or additional key performance indicators, for example, the performance index analyzer 204 can generate data associated with impacted key performance indicators 246, which can also be provided as an updated list of key performance indicators and corresponding thresholds 248. The updated list of key performance indicators and corresponding thresholds 248, for example, can be used to tune data and processes employed by the performance index generator 202 (e.g., by adjusting and/or adding to an external and/or internal list of key performance indicators, one or more associated thresholds, and/or one or more associated weights).

Figure 3:
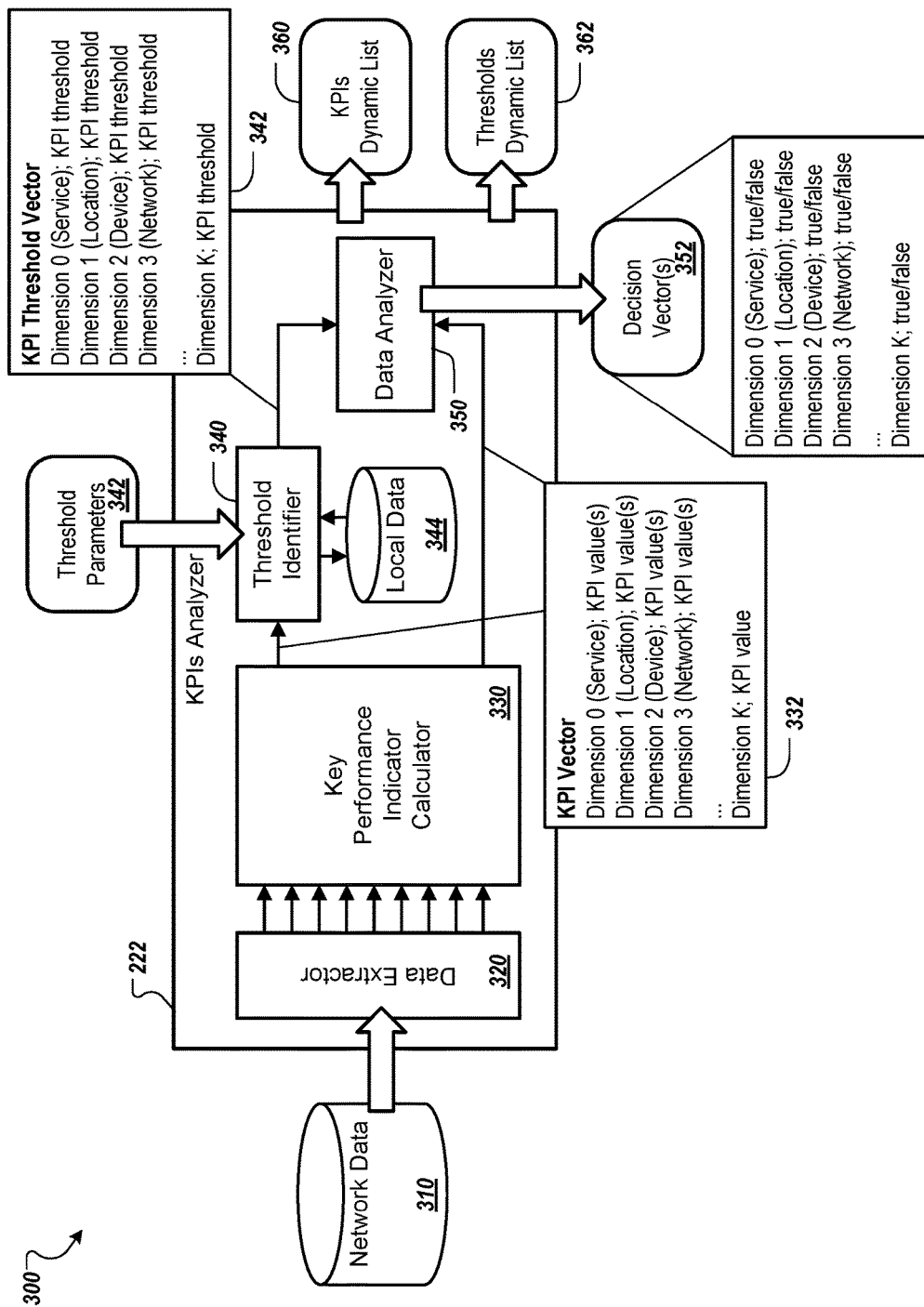

Referring to FIG. 3, an example system 300 is depicted, which shows the operation of the key performance indicator analyzer 222 (also shown in FIG. 2) in further detail. The key performance indicator analyzer 222, for example, can receive data that pertains to various key performance indicators from a network data source 310 (e.g., a data source that can provide the network data 110, shown in FIG. 1). The network data source 310, for example, can include network data, business support system data, and other data related to and/or maintained by a communication network provider (e.g., a mobile and/or fixed communication network provider). To receive the data, for example, the key performance indicator analyzer 222 can use a data extractor 320 (e.g., similar to the data extractor 120, also shown in FIG. 1) to communicate with the network data source 310 using a network communication protocol, an application programming interface, and/or another suitable technique. The data extractor 320, for example, can extract data related to the key performance indicators to be analyzed (e.g., key performance indicators in the list of external KPIs 230, key performance indicators in the list of internal KPIs 236, and additional key performance indicators). The key performance indicator calculator 330 can receive the extracted data related to the key performance indicators, for example, and can analyze the data for each key performance indicator in multiple dimensions, as discussed with reference to FIG. 4.

Figure 4:
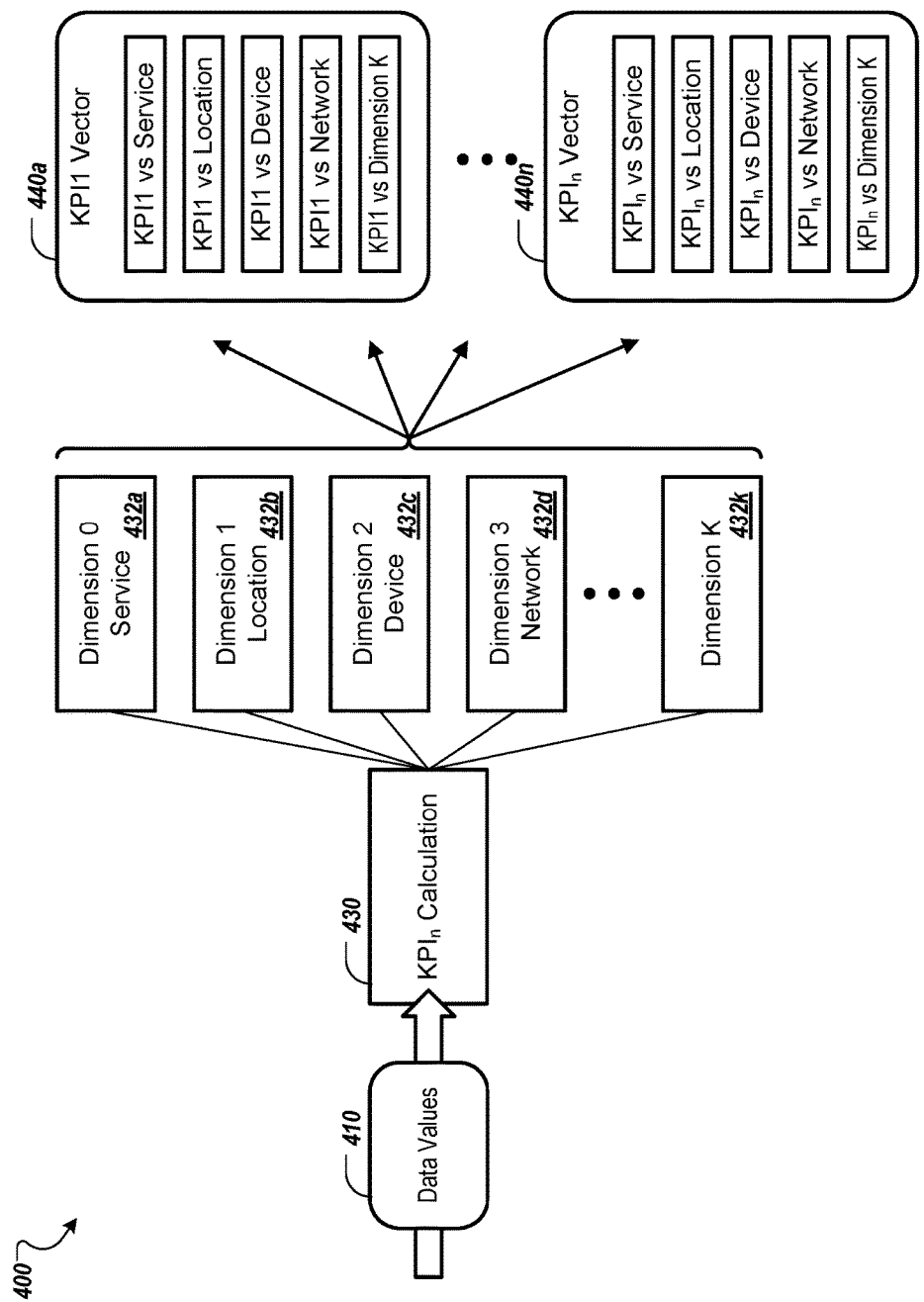

Referring to FIG. 4, an example system 400 is depicted, which shows the operation of the key performance indicator calculator 330 (shown in FIG. 3) in further detail. As shown in FIG. 4, for example, one or more data values 410 related to a particular key performance indicator are received. In general, a value for each key performance indicator may be calculated using suitable component data values and a corresponding formula. For an access rate key performance indicator related to failed mobile communication network attach events (e.g., AttachFail), for example, the data values 410 may include various values used to calculate the AttachFail key performance indicator value, including an AttachFailNetwork value, an AttachFailUsers value, an AttachSuccess value, and an AttachAttempt value. To calculate the AttachFail key performance indicator in the present example, the AttachFailNetwork value may be added to the AttachFailUsers value, and the resulting sum may be divided by the sum of the AttachSuccess value and the AttachAttempt value.

In general, each key performance indicator under analysis may be analyzed in each of multiple different dimensions. After receiving one or more data values 410 used to calculate the AttachFail key performance indicator (KPI), for example, a multidimensional calculation 430 may be performed for the particular key performance indicator. In the present example, an AttachFail KPI value may be calculated for a service dimension 432*a*, a location dimension 432*b*, a device dimension 432*c*, a network dimension 432*d*, and other suitable dimensions (e.g., dimension K 432*k*). To calculate the AttachFail KPI value in multiple different dimensions, for example, the received data values 410 (e.g., the component data values for calculating the AttachFail value) can be filtered for each of the different dimensions prior to performing the calculation for the dimension. For example, to calculate the AttachFail KPI value in the service dimension 432*a*, component data values of the key performance indicator (e.g., AttachFailNetwork, AttachFailUsers, AttachSuccess, and AttachAttempt) can be filtered by each type of service provided by a communication network (e.g., voice, data, multimedia messaging service (MMS), short messaging service (SMS), and other appropriate services), and a different KPI value can be calculated for each different type of service. As another example, to calculate the AttachFail KPI value in the location dimension 432b, component data values of the key performance indicator can be filtered for each location serviced by a mobile communication network (e.g., GPS coordinates, cell site, zip code, city, state, or another suitable location), and a different KPI value can be calculated for each different location. As another example, to calculate the AttachFail KPI value in the device dimension 432c, component data values of the key performance indicator can be filtered for each type of device serviced by a mobile communication network (e.g., a mobile phone model, a smartphone model, a tablet model, or another suitable device type), and a different KPI value can be calculated for each different type of device. As another example, to calculate the AttachFail KPI value in the network dimension 432d, component data values of the key performance indicator can be filtered for each type of network offered by a mobile communication network (e.g., 2G, 3G, 4G, 5G, WiFi), and a different KPI value can be calculated for each different type of network.

In some implementations, a key performance indicator vector may be generated for each key performance indicator (KPI) under analysis, the key performance indicator vector including one or more values for each of the multiple different dimensions. After performing the multidimensional calculation 430 based on the data values 410 used to calculate a key performance indicator (e.g., an AttachFail KPI), for example, a key performance indicator vector 440a (e.g., "Vector KPI1") can be generated for the key performance indicator, including one or more KPI values for a service dimension, one or more KPI values for a location dimension, one or more KPI values for a device dimension, one or more KPI values for a network dimension, and one or more KPI values for various other dimensions. Similarly, a vector 440n (e.g., "Vector KPI.") can be generated for another, different key performance indicator, including one or more KPI values for the service dimension, the location dimension, the device dimension, the network dimension, and various other dimensions.

In general, some communication network providers may track key performance indicator values in only one dimension. By further analyzing each key performance indicator in multiple different dimensions, for example, polarization in different dimensions can be determined, which may be useful for identifying and troubleshooting particular types of problems which may occur in communication networks. For example, dropped calls may occur more frequently in one or more areas relative to other areas serviced by a mobile communication network, and/or may occur more frequently for one or more types of devices (e.g., mobile phone models) relative to other types of devices.

Referring again to FIG. 3, for example, the key performance indicator calculator 330 can provide a key performance indicator vector (e.g., KPI vector 332, similar to the KPI vectors 440a, 440n, shown in FIG. 4) for each key performance indicator (KPI) under analysis to a threshold identifier 340 and to a data analyzer 350. The key performance indicator vector 332, for example, can include one or more calculated key performance indicator values for each of multiple different dimensions, including a service dimension, a location dimension, a device dimension, a network dimension, and other suitable dimensions. Calculated key performance indicator values for the service dimension, for example, can include KPI values for each of voice, data, multimedia messaging service (MMS), short messaging service (SMS), and other services provided by a mobile communication network. Calculated key performance indicator values for the location dimension, for example, can include KPI values for each location (e.g., GPS coordinates, cell site, zip code, city, state, or another suitable location) serviced by a mobile communication network. Calculated key performance indicator values for the device dimension, for example, can include KPI values for each of different mobile phone models, smartphone models, tablet models, and other device types serviced by a mobile communication network. Calculated key performance indicator values for the network dimension, for example, can include KPI values for each of 2G, 3G, 4G, 5G and WiFi networks available from a mobile communication network. Key performance indicator vectors for a fixed communication network, for example, may be similarly provided.

The threshold identifier 340 can receive the key performance indicator vector 332, for example, and can determine, in multiple dimensions, appropriate threshold values for the key performance indicator per dimension, as discussed with reference to FIG. 5. For example, various machine learning approaches (e.g., linear regression, neural networks, statistical approaches, etc.) can be used to determine appropriate threshold values per dimension. In some implementations, the threshold identifier 340 may receive one or more threshold parameters 342, and one or more key performance indicator threshold values may be determined based at least in part on the received parameters. For example, the threshold parameters 342 can be received from a communication network provider, and can be used by the threshold identifier 340 to apply an appropriate threshold range (i.e., a minimum threshold value and a maximum threshold value) for a key performance indicator value. In some implementations, the threshold identifier 340 may communicate with a local data source 344, which can provide data buffering to perform data analysis of key performance indicators over various timeframes a part of determining one or more key performance indicator threshold values.

Figure 5:
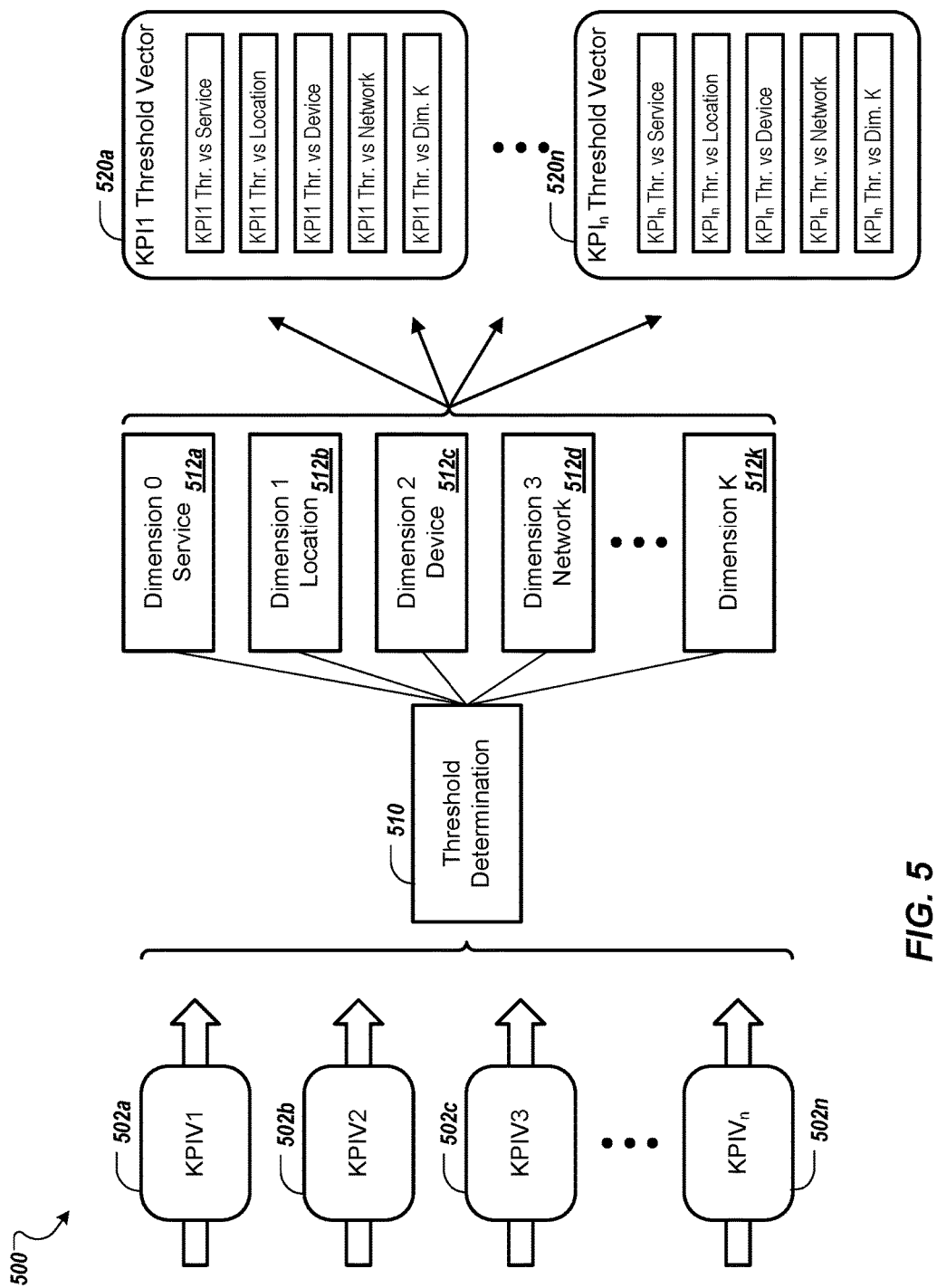

Referring now to FIG. 5, an example system 500 is depicted, which shows the operation of the threshold identifier 340 (shown in FIG. 3) in further detail. As shown in FIG. 5, for example, multiple different key performance indicator (KPI) vectors (e.g., KPI vector 502a, KPI vector 502b, KPI vector 502c, and KPI vector 502n) are received. For example, the KPI vectors 502a-502n can be similar to the KPI vectors 440a-440n (shown in FIG. 4) and the KPI vector 332 (shown in FIG. 3).

In general, each key performance indicator vector may include one or more values for each of multiple different dimensions, and appropriate thresholds may be determined for each key performance indicator vector per dimension. After receiving the key performance indicator vector 502a, for example, a threshold determination operation 510 can be performed for the KPI vector, in each of multiple different dimensions (e.g., a service dimension 512a, a location dimension 512b, a device dimension 512c, a network dimension 512d, and other suitable dimensions, such as "Dimension K" 512k), to determine appropriate threshold values for the key performance indicator in each dimension. In some implementations, key performance indicator threshold values may vary per dimension. For example, the threshold determination operation 510 can determine an average value for a key performance indicator in a particular dimension over a predetermined timeframe (e.g., a day, a week, a month), and can specify a threshold value or range of threshold values (i.e., a minimum threshold value and a maximum threshold value) for the key performance indicator in the particular dimension. In some implementations, key performance indicator threshold values may be the same for each dimension. For example, the threshold determination operation 510 can determine an average value for a key performance indicator over the predetermined timeframe, and can specify the specified threshold value or range of threshold values for the key performance indicator in each of the dimensions. As a result of performing the threshold determination operation 510 for each key performance indicator vector, for example, a corresponding key performance indicator threshold vector can be generated for the key performance indicator vector. For example, a key performance indicator threshold vector 520a that corresponds to the key performance indicator vector 502a can be generated, a key performance indicator threshold vector 520n that corresponds to the key performance indicator vector 502n, and so forth. Each of the key performance indicator threshold vectors 520a, 520n, for example, can include one or more threshold values per dimension (e.g., service, location, device, network, etc.).

Referring again to FIG. 3, for example, the threshold identifier 340 can provide a key performance indicator threshold vector 342 (e.g., similar to the key performance indicator threshold vectors 520a, 520n, shown in FIG. 5) to the data analyzer 350. In general, a key performance indicator vector and a key performance indicator threshold vector may be received for each key performance indicator under analysis, and a decision vector may be generated that indicates whether one or more actions are to be automatically performed in regard to the key performance indicator. For example, the data analyzer 350 can receive the key performance indicator vector 332 and the corresponding key performance indicator threshold vector 342, can determine, in multiple dimensions, whether the key performance indicator passes or fails a comparison against a threshold value (e.g., meets or exceeds a threshold value, or falls within a range of threshold values), and can generate a decision vector 352 based on the determination.

In general, each key performance indicator vector may include one or more values for each of multiple different dimensions, and each of the key performance indicator values may be compared to one or more corresponding threshold values included in a corresponding key performance indicator threshold vector, to identify one or more dimensions for which the key performance indicator value fails a threshold comparison against the corresponding threshold value. After receiving the key performance indicator vector 332 (e.g., a DroppedCall KPI vector) and the corresponding key performance indicator threshold vector 342, for example, the data analyzer 350 can compare the KPI vector 332 to the KPI threshold vector 342, in each of multiple different dimensions. In the present example, the DroppedCall KPI vector can be compared to one or more corresponding DroppedCall KPI threshold values in a service dimension, a location dimension, a device dimension, a network dimension, and other suitable dimensions (e.g., "Dimension K"). Considering an example DroppedCall KPI threshold value (two percent for all dimensions, one percent for one or more dimensions and two percent for other dimensions, or other suitable threshold values), for example, values for the DroppedCall KPI vector can be compared with the corresponding DroppedCall KPI threshold value in each of the dimensions. Based on the comparison, for example, the corresponding decision vector 352 can be generated to include, for each of the dimensions, one or more comparison results that indicate whether the DroppedCall KPI vector value meets the DroppedCall KPI threshold value. For example, if a DroppedCall KPI vector value for a particular type of device does not meet the DroppedCall KPI threshold value (e.g., exceeds the threshold value, is less than the threshold value, does not fall within a range of values, or another suitable comparison), the corresponding decision vector 352 can include a binary value (e.g., true/false, pass/fail, 1/0, or another suitable value) that indicates that a threshold comparison has failed (e.g., the threshold value has not been met) for that type of device.

In some implementations, a determination of a threshold failure (e.g., a key performance indicator value for a particular dimension has or has not met a corresponding threshold value) may be based on multiple comparisons over time. For example, the local data 344 can store (e.g., buffer, cache) comparison results for one or more previous comparison events (e.g., occurring every five minutes, fifteen minutes, an hour, or another suitable time interval), and the decision vector 352 can be generated to include a comparison result that indicates that a threshold value has or has not been met by a key performance indicator value in a particular dimension, in response to a predetermined number (e.g., two, three, or another suitable value) of consecutive occurrences of the key performance indicator value having failed the threshold comparison. For example, if the DroppedCall KPI vector value for a particular type of device does not meet the DroppedCall KPI threshold value for two consecutive comparison events, the corresponding decision vector 352 can include a binary value that indicates that the threshold value has not been met for that type of device. As another example, the decision vector 352 can be generated to include a comparison result that indicates that a threshold value has not been met by a key performance indicator value in a particular dimension, in response to a predetermined percentage (e.g., 50%, 80%, 90%, or another suitable percentage) of occurrences of the key performance indicator value having failed the threshold comparison, in a predetermined observation window (e.g., five, ten, twenty, or another suitable number of comparison events). For example, if the DroppedCall KPI vector value for a particular type of device does not meet the DroppedCall KPI threshold value at least fifty percent of the time over ten consecutive comparison events, the corresponding decision vector 352 can include a binary value that indicates that the threshold value has not been met for that type of device.

In general, in response to a failed threshold comparison (e.g., a threshold value has not been met by a corresponding key performance indicator value for a particular dimension), data may be provided to refine a technique for generating a performance index, and/or one or more actions may be automatically performed. For example, if the decision vector 352 indicates that a threshold value has or has not been met by a corresponding key performance indicator value for a particular dimension (e.g., a DroppedCall KPI vector value for a particular type of device has not met its corresponding threshold value), the key performance indicator (KPI) analyzer 222 may determine that the key performance indicator is relevant to the performance index. In response to the determining, for example, the key performance indicator (KPI) analyzer 222 can include information related to the key performance indicator in a dynamic list 360 of discovered key performance indicators and a dynamic list 362 of corresponding thresholds. In some implementations, information related to the key performance indicator and included in a dynamic list may include dimension information related to one or more dimensions in which a failed threshold comparison had occurred. For example, the dynamic list 360 may include information indicating that a particular dimension of a particular key performance indicator is relevant to generating the performance index (e.g., DroppedCall for a particular type of device), and/or the corresponding threshold(s) determined for the key performance indicator for the dimension may be included in the dynamic list 362.

In some implementations, one or more actions may be performed for resolving an issue linked to a key performance indicator and a particular dimension, based at least in part on a determination that a failed threshold comparison has occurred (e.g., a threshold value has or has not been met by its corresponding key performance indicator value for the particular dimension). For example, if a DroppedCall KPI vector value for a particular type of device has not met its corresponding threshold value, a notification can be provided to the network automation system 106 (shown in FIG. 1), and configuration settings related to the type of device may be modified and/or device software may be modified and distributed by the network system 102. As another example, if a DroppedCall KPI vector value for a particular location has not met its corresponding threshold value, a notification can be provided to the network automation system 106, and the system can automatically modify communications settings and/or automatically increase power for the network system 102 in that location.

Referring again to FIG. 2, for example, the performance index generator 202 can receive the updated list of key performance indicators and corresponding thresholds 248 (e.g., including the dynamic list 360 of key performance indicators and the dynamic list 362 of corresponding thresholds, shown in FIG. 3). The updated list of key performance indicators and corresponding thresholds 248, for example, can be used to tune data and processes employed by the performance index generator 202. For example, the performance index generator 202 can adjust the internal list of key performance indicators, thresholds, and weights 236 to include data from the updated list of key performance indicators and corresponding thresholds 248. Thus, the internal list of key performance indicators, thresholds, and weights 236 referenced by the performance index generator 202 to generate a performance index score 240 may be automatically and dynamically updated to reflect the changing conditions of a communication network. For example, particular key performance indicators which may be relevant for generating the performance index score 240 for one or more communication networks may or may not be relevant for others, and/or key performance indicator thresholds which may be appropriate for one or more communication network may or may not be relevant for others. By periodically comparing the generated performance index score 240 with the external performance index score 242, and by evaluating communication network data (e.g., the network data 310, shown in FIG. 1) when discrepancies occur, for example, key performance indicators and corresponding thresholds can be discovered (and/or can be segmented into multiple dimensions) and can be selected to improve the capability of the performance index generator 202 to generate an accurate performance index score 240.

Figure 6:
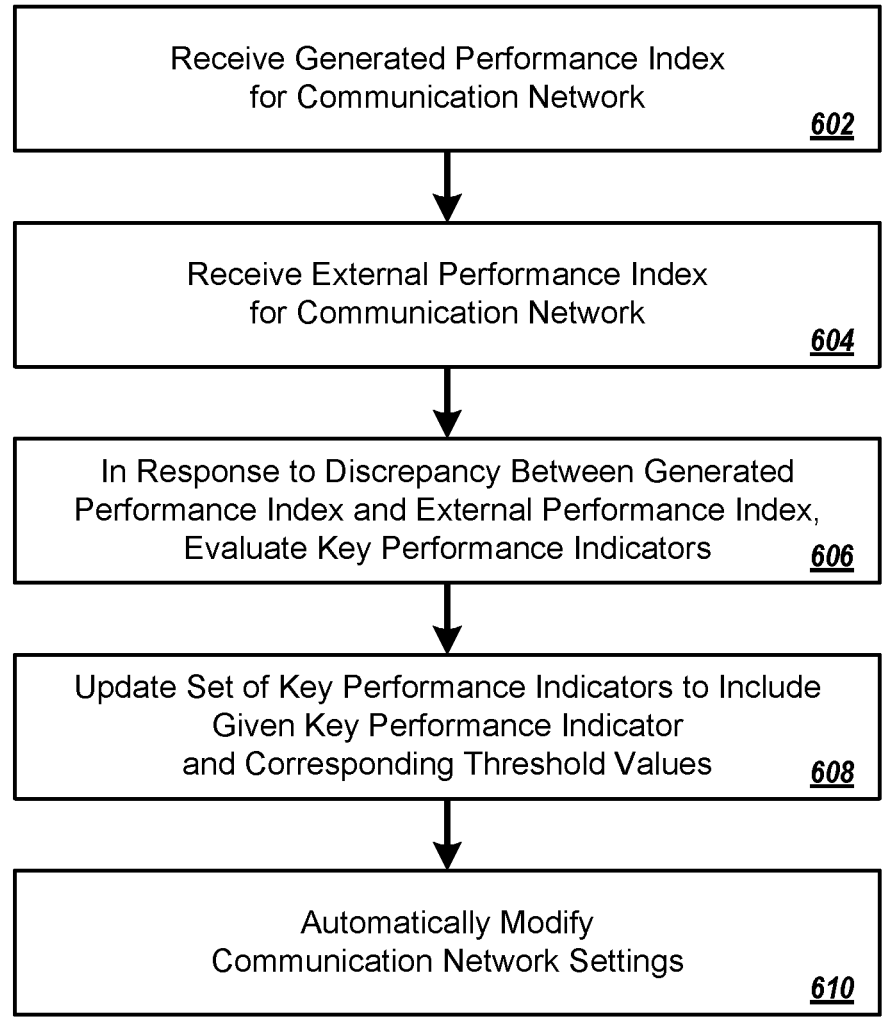
FIG. 6 depicts an example process that can be executed in implementations of the present disclosure.

FIG. 6 depicts an example process 600 that can be executed in implementations of the present disclosure. For example, the process 600 can be executed by the example systems described above with reference to FIGS. 1-5.

A generated performance index is received for a communication network (602). The performance index can be generated based at least in part on a set of key performance indicators and corresponding thresholds values. Referring to FIG. 2, for example, performance index analyzer 204 can receive the performance index score 240 generated by the performance index generator 202, based on the internal list of key performance indicators, thresholds, and weights 236, the external list of key performance indicators (KPIs) 230, associated external KPI thresholds 232, and associated external KPI weights 234.

An external performance index is received for the communication network (604). The external performance index can represent user experience with the communication network. For example, the performance index analyzer 204 (shown in FIG. 2) can receive the external performance index score 242, which represents user experience with the network system 102 (shown in FIG. 1).

In response to determining a discrepancy between the generated performance index and the external performance index, one or more key performance indicators associated with the communication network are evaluated (606). For example, the performance index analyzer 204 (shown in FIG. 2) can evaluate one or more key performance indicators associated with the network system 102 (shown in FIG. 1). In general, the evaluating can include, for each key performance indicator, receiving data associated with the key performance indicator, determining a key performance indicator value and one or more corresponding threshold values for the key performance indicator (e.g., based at least in part on the received data), and comparing the key performance indicator value to the corresponding one or more threshold values. In some implementations, the data associated with the key performance indicator may be communication event data received from the communication network. For example, the key performance index analyzer 222 (shown in FIG. 2 and in further detail in FIG. 3) can use the data extractor 320 to extract data from the network data source 310.

In some implementations, the one or more key performance indicators under evaluation may include at least one key performance indicator included in the set of key performance indicators on which the generated performance index for the communication network is based. For example, one or more key performance indicators evaluated by the key performance index analyzer 222 may be included in the internal list of key performance indicators 236 or may be included in the external list of key performance indicators 230 used to generate the performance index score 240 (shown in FIG. 2).

In some implementations, the one or more key performance indicators under evaluation may include at least one key performance indicator not included in the set of key performance indicators on which the generated performance index for the communication network is based. For example, one or more key performance indicators evaluated by the key performance index analyzer 222 may not be initially included in either the internal list of key performance indicators 236 nor in the external list of key performance indicators 230 used to generate the performance index score 240 (shown in FIG. 2).

In some implementations, determining the key performance indicator value may include identifying a plurality of components of the key performance indicator, identifying a component value for each of the plurality of components, and performing a calculation using the respective component values. For example, the key performance index analyzer 222 can identify components for each key performance under evaluation.

In some implementations, evaluating one or more key performance indicators associated with the communication network may be performed in multiple dimensions. Referring to FIG. 4 and FIG. 5, for example, a multidimensional analysis of various key performance indicators is shown.

The dimensions, for example, may include two or more of a service dimension that indicates a type of service provided by the communication network, a location dimension that indicates a location serviced by the communication network, a device dimension that indicates a type of device serviced by the communication network, and a network dimension that indicates a type of network offered by the communication network. In general, the received data can be filtered for each of two or more different dimensions, and for each given dimension of the two or more different dimensions a key performance indicator value and one or more corresponding threshold values can be determined for the key performance indicator in the given dimension. The key performance indicator value can be compared to the corresponding one or more threshold values in the given dimension.

In some implementations, a series of comparison results associated with comparing each key performance indicator value to its one or more corresponding thresholds may be stored, and the set of key performance indicators may be updated based on the stored series of comparison results. Referring again to FIG. 3, for example, the key performance index analyzer 222 can store (e.g., buffer, cache) previous comparison results in the local data store 344. The set of key performance indicators can be updated, for example, to include the given key performance indicator and its one or more corresponding threshold values in response to two or more consecutive occurrences of the given key performance indicator failing the threshold comparison against its one or more corresponding threshold values. As another example, the set of key performance indicators can be updated to include the given key performance indicator and its one or more corresponding threshold values in response to a predetermined percentage of occurrences of the given key performance indicator failing the threshold comparison against its one or more corresponding threshold values in a predetermined observation window.

In response to determining that a value of a given key performance indicator fails a threshold comparison against its one or more corresponding threshold values, the set of key performance indicators can be updated to include the given key performance indicator and its one or more corresponding threshold values (608). Referring again to FIG. 2, for example, the performance index analyzer 204 can provide the updated list of key performance indicators and corresponding thresholds 248 to the performance index generator 202, which can use the data for updating the internal list of key performance indicators, thresholds, and weights 236.

In response to determining that the value of the given key performance indicator fails a threshold comparison against its one or more corresponding threshold values, one or more settings for the communication network can be automatically modified (610). Referring again to FIG. 1, for example, based on a notification provided by the network data analysis system 104, the network automation system 106 can modify the network system 102.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (Application Specific Integrated Circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for evaluating performance of one or more communication networks, the method being executed by one or more processors and comprising:
   receiving a generated performance index for a communication network, wherein the performance index is generated based at least in part on a set of key performance indicators and corresponding thresholds values, the key performance indicators being measurable aspects of the communication network's performance;
   receiving an external performance index for the communication network, wherein the external performance index is based on data collected from one or more users of the communication network and represents user experience with the communication network;
   in response to determining a discrepancy between the generated performance index and the external performance index, evaluating one or more key performance indicators associated with the communication network, wherein the one or more key performance indicators under evaluation include at least one key performance indicator not included in the set of key performance indicators on which the generated performance index for the communication network is based, the evaluating comprising, for each key performance indicator under evaluation:
   (i) receiving data associated with the key performance indicator;
   (ii) based at least in part on the received data, determining a key performance indicator value and one or more corresponding threshold values for the key performance indicator; and
   (iii) comparing the key performance indicator value to the corresponding one or more threshold values; and
   in response to determining that a value of a given key performance indicator fails a threshold comparison against its one or more corresponding threshold values, (i) updating the set of key performance indicators to include the given key performance indicator and its one or more corresponding threshold values, and (ii) automatically modifying one or more settings for the communication network.

2. The computer-implemented method of claim 1, wherein the data associated with the key performance indicator is communication event data received from the communication network.

3. The computer-implemented method of claim 1, wherein the data associated with the key performance indicator includes data received from one or more business support systems of the communication network.

4. The computer-implemented method of claim 1, wherein the one or more key performance indicators under evaluation includes at least one key performance indicator included in the set of key performance indicators on which the generated performance index for the communication network is based.

5. The computer-implemented method of claim 1, wherein determining the key performance indicator value includes identifying a plurality of components of the key performance indicator, identifying a component value for each of the plurality of components, and performing a calculation using the respective component values.

6. The computer-implemented method of claim 1, wherein the evaluating further comprises:
    filtering the received data for each of two or more different dimensions, and for each given dimension of the two or more different dimensions:
    determining a key performance indicator value and one or more corresponding threshold values for the key performance indicator in the given dimension; and
    comparing the key performance indicator value to the corresponding one or more threshold values in the given dimension.

7. The computer-implemented method of claim 6, wherein the two or more different dimensions includes two or more of a service dimension that indicates a type of service provided by the communication network, a location dimension that indicates a location serviced by the communication network, a device dimension that indicates a type of device serviced by the communication network, and a network dimension that indicates a type of network offered by the communication network.

8. The computer-implemented method of claim 1, further comprising storing a series of comparison results associated with comparing each key performance indicator value to its one or more corresponding thresholds.

9. The computer-implemented method of claim 8, wherein the set of key performance indicators is updated to include the given key performance indicator and its one or more corresponding threshold values in response to two or more consecutive occurrences of the given key performance indicator failing the threshold comparison against its one or more corresponding threshold values, based on the series of comparison results.

10. The computer-implemented method of claim 1, wherein the set of key performance indicators is updated to include the given key performance indicator and its one or more corresponding threshold values in response to a predetermined percentage of occurrences of the given key performance indicator failing the threshold comparison against its one or more corresponding threshold values in a predetermined observation window, based on the stored series of comparison results.

11. A non-transitory computer-readable storage medium coupled to one or more processors and having instructions stored thereon which, when executed by the one or more processors, cause the one or more processors to perform operations for evaluating performance of one or more communications networks, the operations comprising:
    receiving a generated performance index for a communication network, wherein the performance index is generated based at least in part on a set of key performance indicators and corresponding thresholds values, the key performance indicators being measurable aspects of the communication network's performance;
    receiving an external performance index for the communication network, wherein the external performance index is based on data collected from one or more users of the communication network and represents user experience with the communication network;
    in response to determining a discrepancy between the generated performance index and the external performance index, evaluating one or more key performance indicators associated with the communication network, wherein the one or more key performance indicators under evaluation include at least one key performance indicator not included in the set of key performance indicators on which the generated performance index for the communication network is based, the evaluating comprising, for each key performance indicator under evaluation:
        (i) receiving data associated with the key performance indicator;
        (ii) based at least in part on the received data, determining a key performance indicator value and one or more corresponding threshold values for the key performance indicator; and
        (iii) comparing the key performance indicator value to the corresponding one or more threshold values; and
    in response to determining that a value of a given key performance indicator fails a threshold comparison against its one or more corresponding threshold values, (i) updating the set of key performance indicators to include the given key performance indicator and its one or more corresponding threshold values, and (ii) automatically modifying one or more settings for the communication network.

12. The non-transitory computer-readable storage medium of claim 11, wherein the evaluating further comprises:
    filtering the received data for each of two or more different dimensions, and for each given dimension of the two or more different dimensions:
    determining a key performance indicator value and one or more corresponding threshold values for the key performance indicator in the given dimension; and
    comparing the key performance indicator value to the corresponding one or more threshold values in the given dimension.

13. The non-transitory computer-readable storage medium of claim 11, the operations further comprising storing a series of comparison results associated with comparing each key performance indicator value to its one or more corresponding thresholds.

14. A system, comprising:
    one or more processors; and
    a computer-readable storage device coupled to the one or more processors and having instructions stored thereon which, when executed by the one or more processors, cause the one or more processors to perform operations for evaluating performance of one or more communication networks, the operations comprising:
    receiving a generated performance index for a communication network, wherein the performance index is generated based at least in part on a set of key performance indicators and corresponding thresholds values, the key performance indicators being measurable aspects of the communication network's performance;
    receiving an external performance index for the communication network, wherein the external performance index is based on data collected from one or more users of the communication network and represents user experience with the communication network;
    in response to determining a discrepancy between the generated performance index and the external performance index, evaluating one or more key performance indicators associated with the communication network, wherein the one or more key performance indicators under evaluation include at least one key performance indicator not included in the set of key performance indicators on which the generated performance index for the communication network is based, the evaluating comprising, for each key performance indicator under evaluation:

(i) receiving data associated with the key performance indicator;
(ii) based at least in part on the received data, determining a key performance indicator value and one or more corresponding threshold values for the key performance indicator; and
(iii) comparing the key performance indicator value to the corresponding one or more threshold values; and in response to determining that a value of a given key performance indicator fails a threshold comparison against its one or more corresponding threshold values, (i) updating the set of key performance indicators to include the given key performance indicator and its one or more corresponding threshold values, and (ii) automatically modifying one or more settings for the communication network.

15. The system of claim 14, wherein the evaluating further comprises:

filtering the received data for each of two or more different dimensions, and for each given dimension of the two or more different dimensions:

determining a key performance indicator value and one or more corresponding threshold values for the key performance indicator in the given dimension; and comparing the key performance indicator value to the corresponding one or more threshold values in the given dimension.

16. The system of claim 14, the operations further comprising storing a series of comparison results associated with comparing each key performance indicator value to its one or more corresponding thresholds.

17. The computer-implemented method of claim 1, wherein the key performance indicators include one or more of a drop rate indicator, an access rate indicator, a connection time indicator, a call duration indicator, a data throughput indicator, and a latency indicator.

18. The computer-implemented method of claim 1, wherein the data collected from the one or more users of the communication network is survey data provided by the one or more users in response to a poll.

* * * * *

UNITED STATES PATENT AND TRADEMARK OFFICE
CERTIFICATE OF CORRECTION

| | |
|---|---|
| PATENT NO. | : 10,511,510 B2 |
| APPLICATION NO. | : 15/350635 |
| DATED | : December 17, 2019 |
| INVENTOR(S) | : Alessio Ricci |

It is certified that error appears in the above-identified patent and that said Letters Patent is hereby corrected as shown below:

In the Claims

Claim 10, Column 21, Line 41, before "series" delete "stored".

Signed and Sealed this
Thirteenth Day of February, 2024

Katherine Kelly Vidal
*Director of the United States Patent and Trademark Office*